June 30, 1931.  E. C. THOMPSON  1,812,182
COMPENSATING WINDING GEAR FOR CAMERAS
Filed May 16, 1929    2 Sheets-Sheet 1
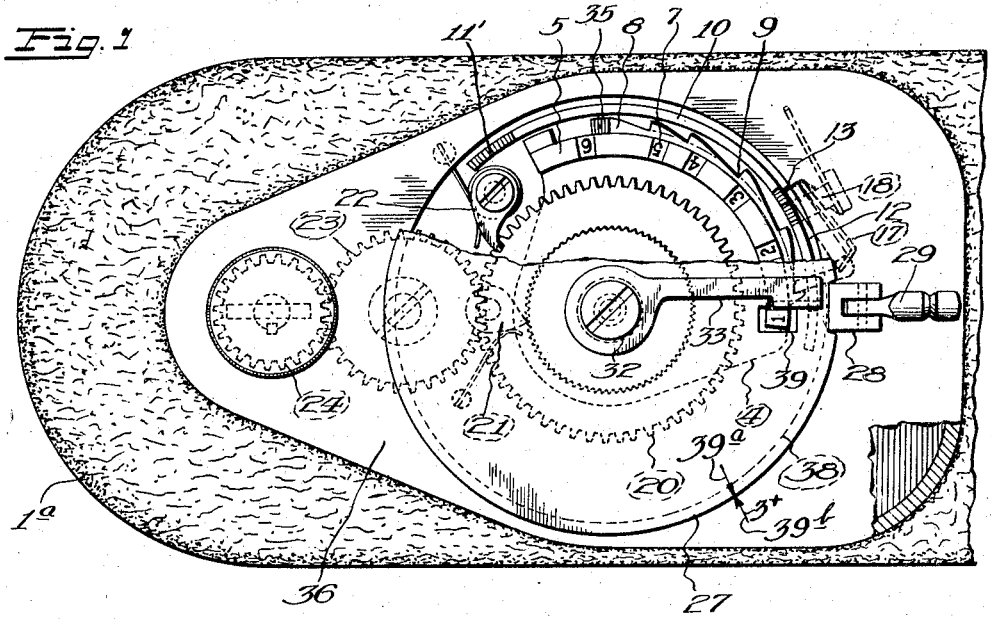
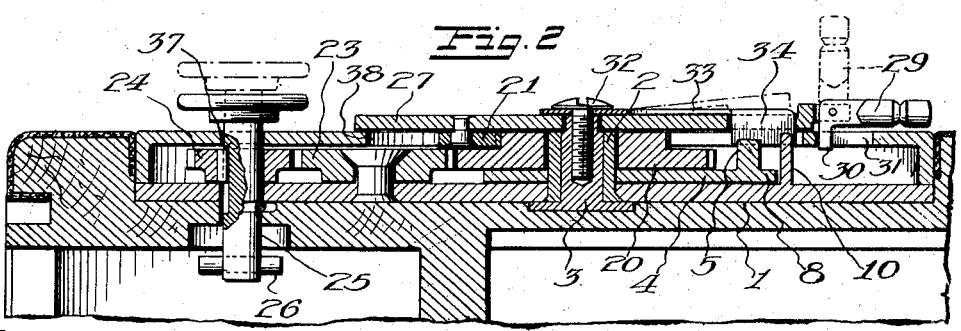
INVENTOR.
Eugene C. Thompson
BY Frank L. Belknap
ATTORNEYS.

June 30, 1931.                E. C. THOMPSON                1,812,182
                    COMPENSATING WINDING GEAR FOR CAMERAS
                       Filed May 16, 1929      2 Sheets-Sheet 2
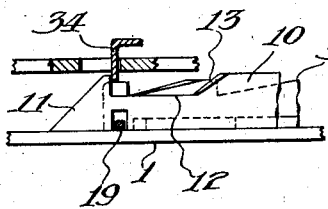
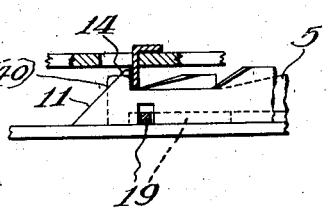
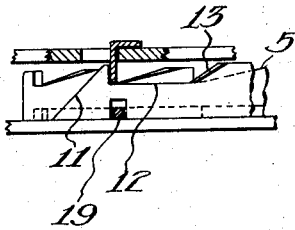
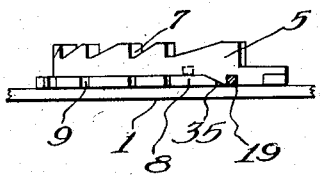
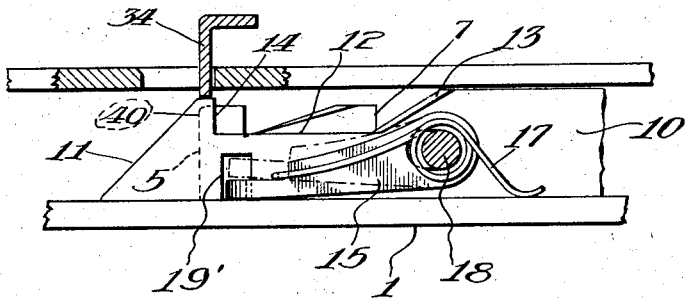
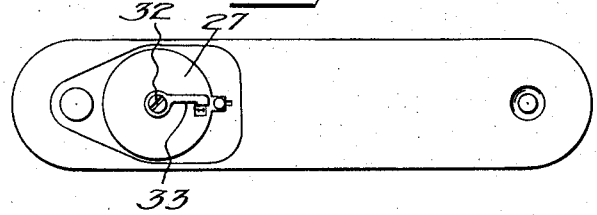
INVENTOR.
Eugene C. Thompson
BY Frank L. Belknap
ATTORNEYS.

Patented June 30, 1931

1,812,182

UNITED STATES PATENT OFFICE

EUGENE C. THOMPSON, OF LOS ANGELES, CALIFORNIA

COMPENSATING WINDING GEAR FOR CAMERAS

Application filed May 16, 1929. Serial No. 363,340.

This invention relates to improvements in winding devices, and more particularly to compensating winding gear for use on a roll film camera, or other device where it may be desirable or expedient to wind a fixed length of film or tape upon a reel or spool by an automatically predetermined revolution or fractional revolution of the winding handle.

Among the important objects of the invention are to provide a device which in itself contains the necessary mechanism to bring a film in an ordinary roll film camera to so-called first exposure position; and to provide a device which then automatically brings into action a compensating stop which will be operative during the usual successive exposures, for example six; and to provide a device of the character described in which this stop will then be automatically placed in an inoperative position to allow the protective paper strip at the end of the film roll to be rapidly wound upon the receiving spool; to provide a device of the character above referred to which insures against accidental displacement of the winding handle from its initial position; to provide a device which is so arranged as to prevent the entrance of particles of foreign matter into the operating mechanism; to provide an inexpensive and compact device which can be applied to standard types of roll film cameras, and which at the same time will be reliable in operation; and to provide a construction which will perform all the steps necessary to the winding of a film, including the protective paper strips at each end thereof, without the necessity of employing an auxiliary winding device, or at any time looking through the usual colored glass at the back of the camera in order to determine whether or not the film is in proper exposure position; and in general to provide an improved construction of the character of device referred to.

In order to more clearly understand the invention I have attached the accompanying drawings, in which Fig. 1 is a top plan view, partly in section, with parts cut away and other parts shown in dotted lines.

Fig. 2 is a vertical sectional view of the same.

Figs. 3, 4 and 5 are detail fragmentary top views, showing more particularly the sector plate, cam rail and detent, in different positions.

Figs. 6, 7, 8 and 9 are detail fragmentary views, partly in side elevation, and partly in vertical section, showing the cam rail, the sector plate, a section of the detent nib, and the crank latch.

Fig. 10 is a fragmentary detail view, partly in side elevation, and partly in vertical section, showing the detent for controlling the sector rack, and a section of the crank latch.

Fig. 11 is a diagrammatic view of the device as applied to a standard type of camera.

Referring more in detail to the drawings, the reference numeral 1a indicates generally a fragmentary view of a portion of the casing of the usual roll film camera. These casings are customarily constructed of metal, wood or the like. A bed plate 1 is set into a recess in the wall of the said camera casing 1a, and into this plate is set a tubular stud 2, as shown in Fig. 2. Adapted to turn in this stud 2 is a flanged pivot bolt 3. A relatively thin sector plate 4, having an arcuate flange 5 formed thereon, and preferably integral therewith, and being provided with an aperture 6 is mounted upon the tubular stud 2 so as to turn freely thereon. The flange 5 is provided at its upper edge with a series of variably spaced notches 7. The variable spacing of the notches is a function of the increasing diameter of the film roll as the film is rolled after each exposure, which will hereinafter be more fully described. The sector plate 4 projects beyond the arcuate flange 5, as shown best at 8 in Figs. 1, 3, 4 and 9, the said projection being provided at its curved edge with a series of ratchet teeth 9. The spacing of the teeth 9 is also a function of the varying diameter of the film roll, and corresponds with the notches 7. The last ratchet tooth 35 is sloped downwardly from the upper surface thereof; the purpose thereof will be hereinafter more fully described. The double racked portion, above described, will be referred to as the sector rack henceforth, for the sake of convenience.

Arranged concentrically with the edge of the sector rack and suitably attached to the bed plate 1, is a cam rail 10, sloped at each end, as shown at 11 and 11' of Figs. 10 and 1, respectively. Adjacent the sloped end 11 and provided in the upper edge of the cam rail 10 is an elongated notch 12, sloping at one end 13, and vertical at the other, 14. Mounted immediately below the notch 12 and upon the cam rail 10 is a doubly pivoted detent 15 adapted to move vertically, as shown best in dotted lines in Fig. 10, and also in and out in a horizontal direction, as shown best in dotted lines in Fig. 3. The detent 15 is controlled by a single spring 17, so mounted as to afford tension both vertically and axially with respect to the detent rivet 18. The detent 15 is provided with a turned in nib 19 which, in turn, is adapted to be positioned in an opening 19' in the cam rail 10, and operate in conjunction with the ratchet teeth 9.

On the stud 2 is mounted a gear wheel 20, rabbeted to make space for a pawl 21 positioned upon a winding handle 27, and the rabbeted portion may be knurled for better engagement with the pawl 21. The handle or rotating cover plate is freely mounted on the stud 3, and as will be obvious from an inspection of Fig. 1, motion of the handle in one direction also turns the gear 20, by means of the engagement of the pawl 21, but reverse motion of the handle allows the same to move independently of the said gear. A pawl 22 mounted on the bed plate adjacent the gear 20 further restricts the motion of the said gear in the reverse direction. The driving gear 20 meshes with an idler gear 23, and the idler gear in turn meshes with a pinion 24, which is slidably but non-rotatably mounted on a shaft 25. The shaft 25 is the usual winding key shaft of the conventional roll film camera, and carries a cross member 26 for engagement with the slotted end of a film spool (not shown).

The handle 27 is circular in shape and has mounted upon its edge a bifurcated projection 28. Pivotally mounted between the two legs of the said projection is a foldable thumb knob 29, being provided with a right angle projection or nib 30, which is adapted to engage a groove 31 in the cover plate when the knob is not being held upright by the fingers. The knob may be controlled by a small spring or the like (not shown).

Mounted rigidly with respect to the circular handle 27 by means of a screw 32, set in the pivot bolt 3, is a resilient latch 33. The said latch is bent at right angles to itself at its outer end, forming a nib 34, adapted to pass through a registering slot in the handle 27.

A cover plate 36 is formed preferably of metal, and shaped to conform to the contour of the depressed section of the camera wall, and is perforated, as shown at 37 in Fig. 2, for the passage of the pinion shaft 25. In addition, a circular portion 38 is cut out, over which the handle 27 is positioned. An opening 39 is provided in the handle 27 through which numerals marked on the flanged rack 5 can be seen.

In operation, the handle 27 is placed in initial position, that is, with the thumb knob 29 turned downwardly so that the nib 30 engages in the groove 31, and the sector rack 4 is in inoperative position, shown best in Fig. 3. A fresh roll of film is placed in the camera, in a manner familiar to all camera operators, the end of the paper protecting strip inserted into the receiving spool, and the camera closed. The circular handle 27 is then turned continuously in the direction which also turns the gear 20, and as shown best in Fig. 10, the nib 34 of the resilient latch 33 rides up the slope 11 over an end 40 of the sector rack and falls into the elongated notch 12, thence rides up slope 13 and thence forward upon the top of the cam rail 10, sliding down the slope 11' at the other end of the rail and so on, until the film is in first exposure position. The number of turns and fraction thereof necessary for this has been experimentally determined by the manufacturer. For the sake of example, the handle is turned three full turns, and then to a point where an arrow 39a registers with a corresponding arrow 39b indicated upon the cover plate 36.

As a precaution against error there may be stamped adjacent one arrow a "3+" indicating, for example, three full turns plus a fraction of a turn up to the arrow or any other convenient notation may be used. The handle is then turned backwardly, the pawl 21 slipping over the knurled edge 20' until the latch 33 climbs the end 11' of the cam rail 10 and then drops into the notch 12, where it will engage the first tooth of the sector rack flange 5, and this rack is carried forward until the latch nib 34 of the latch 33 strikes the projection 14 the end 40 being advanced to an initial stop position, as the sector rack moves forward. On removing the fingers from the thumb knob 29 it turns down so that the nib 30 engages the groove 31. The first exposure having been made, the thumb knob is raised, and the handle turned as far as it will go in the direction which will turn the gear 20, that is, until the latch nib 34 contacts the end 40 which is advanced step by step as the exposures are made and the handle turned. The handle is then retracted as before, and the sector rack advanced another step, being held in each advanced position by the detent 15, that is, by the engagement of the nib 19 in the ratchet teeth 9.

When the last exposure has been made the detent nib 19 will occupy a position, as shown best in Fig. 9, that is, at the foot of the slope 35. As the handle is turned and the latch nib 34 contacts the end 40 of the sector rack, the detent nib will no longer hold the sector rack, but will climb the slope 35, and will ride along the shelf between the inner notches of the teeth 9 and the sector rack flange 5. The latch nib 34 will carry the sector plate backward until it reaches the position as shown in Figs. 3, 6 and 10, when the detent nib 19 will drop to the position as shown in Figs. 3 or 6, and the latch nib 34 will climb the projection 14, and allow continuous turning of the handle, as previously described, thus allowing the winding of the paper protecting strip at the end of the film roll. When this has been completely wound, as indicated by reduced resistance to turning, the handle knob 29 is released and engages the groove 31, when the film may be removed and a new roll inserted.

It is apparent that herein is provided an automatically compensated winding mechanism, which lends itself ideally to any type roll film camera with a minimum amount of adaptation. In addition, the device is positively operating and is of a comparatively economical design.

I do not wish to be limited to the specific form shown, but wish to avail myself of equivalent structures not shown by the prior art.

I claim as my invention:

1. In a compensating winding mechanism adapted for use in roll film cameras and the like, the combination of a driving gear wheel and a pinion meshing therewith, a crank, a one-way clutch associated with the crank for effecting the rotation of the driving gear when moved in one direction and for disengaging therefrom when moved in the opposite direction, a pivotally mounted compensating member concentric with and movable independently of the gear wheel, a latch mechanism associated with the crank, and adapted to engage the compensating member, a stop element on the compensating member for restricting the movement of the crank to predetermined fractions of a full revolution, and a cam rail adjacent the compensating member for controlling the latch in relation to its engagement with the compensating member.

2. In a compensating winding mechanism, a gear wheel, a crank and one-way clutch associated with the gear wheel, means cooperating with the crank for permitting a plurality of complete revolutions of said wheel, means for limiting the succeeding movements of the gear wheel to predetermined fractions of a full revolution, means for varying the succeeding fractions of a full revolution relative to each other, and means associated with the crank for permitting continuous rotary movement of the gear wheel after said successive limited movements.

3. In a compensating winding mechanism for roll film cameras and the like, the combination of a gear wheel meshing with a pinion, a crank and one-way clutch associated with the gear wheel, means cooperating with the crank for permitting it to rotate the gear wheel continuously in one direction, said crank also carrying a resilient latch, a compensating member which is provided with a stop for engagement with the latch, said compensating member being pivotally mounted and adapted to be stepped forward by the crank latch in empirically spaced steps so as to limit the movement of the crank to predetermined individual fractions of a full revolution to compensate for the increasing diameter of the roll as a film is wound on a receiving spool, a cam rail adjacent the periphery of the compensating member adapted to control the engagement of the latch with the stop member, a detent pivotally mounted so as to be movable both vertically and axially with relation to its pivot pin, said detent being adapted to retain the compensating member in its successive positions, cooperative means associated with the crank, compensating member, and cam rail for placing the stop in operative position after a film has been brought to first exposure position by a predetermined number of revolutions of the crank, cooperative means associated with the crank, compensating member, and detent, for placing the stop in inoperative position immediately after the last exposure, allowing the crank and gear wheel to be continuously rotated.

4. In a compensating winding mechanism for roll film cameras and the like the combination of a gear wheel meshing with a pinion, a crank and one-way clutch associated therewith, means cooperating with the crank for permitting continuous rotation of the gear wheel in one direction, a pivotally mounted stop member adapted to be stepped forward in empirically spaced steps so as to limit the movement of the crank to predetermined individual fractions of a full revolution and compensate for the increasing diameter of the roll as the film is wound on a receiving spool, a resilient latch associated with the crank for actuating the stop member, a cam rail adjacent the periphery of the stop member adapted to control the engagement of the crank latch with the stop member, a detent pivotally mounted so as to be movable both vertically and axially with relation to its pivot pin, said detent being adapted to control the position of the stop member, cooperative means associated with the crank, stop member, and cam rail for placing the stop member in operative position when a film has been brought to first exposure position by a predetermined number of revolutions of the crank, cooperative means associated with the crank, stop member, and detent for placing the stop member in inoperative position immediately after the last exposure, allowing the crank and gear wheel to be continuously rotated, means for locking the crank against accidental movement when not in operation, graphic means associated with the stop member for indicating the number of successive steps imparted to the stop member, corresponding to the exposure positions of the film.

5. In a compensating winding mechanism for roll film cameras and the like, in combination, a normally inoperative compensating member adapted to be placed in operative position and advanced step by step for a predetermined number of steps, comprising a sector plate member pivotally mounted, carrying on its peripheral edge a plurality of ratchet teeth the retaining surfaces of which are vertical to the plane of the plate, except the last tooth, the retaining surface of which is sloped, and cooperative therewith a detent pivotally mounted so as to be movable both vertically and axially with relation to its pivot pin, means for automatically releasing said detent, and means for automatically returning the compensating member to initial and inoperative position.

6. In winding mechanism for roll film cameras and the like, the combination with mechanism for turning a film spool, of a driving gear, operating connections between said first mentioned mechanism and the driving gear including a one-way clutch, for rotating the gear continuously in driving direction and to disengage therefrom when moved in reverse direction, means including a crank-latch member, a normally inoperative compensating member movably mounted, and having associated therewith a stop for engagement with the crank-latch when the compensating member is in operative position, said compensating member being so formed as to be stepped forward in empirically spaced steps to compensate for the increasing diameter of a film-roll, as it is wound on a receiving spool, means adapted to control the engagement of the crank latch with the compensating member, means for retaining the compensating member in its successive positions, cooperative means associated with the crank and compensating member for placing the compensating member in operative position after a film has been brought to first-exposure position, cooperative means associated with the crank and compensating member for returning the latter to inoperative position to allow the crank and gear wheel to be continuously rotated.

7. The structure claimed according to claim 6, further characterized with means for locking the crank against accidental movement when not in operation.

8. In compensating winding mechanism for roll film cameras and the like, the combination with driving gear, a crank and associated clutch adapted to rotate the gear continuously when moved in one direction and to disengage therefrom when moved in the opposite direction, of a compensating member movable independently of the gear wheel, a stop associated therewith, latch mechanism associated with the crank and adapted to have engagement with the stop, means associated with the compensating member for regulating the position of the stop to restrict the movement of the crank to predetermined fractions of a full revolution, and means for controlling the crank-latch member in relation to its cooperative engagement with the compensating member.

9. In compensating winding mechanism for roll-film cameras and the like, a normally inoperative compensating member adapted to be placed in operative position and advanced step by step, comprising a sector plate pivotally mounted and carrying a stop member, said sector plate having a plurality of ratchet teeth the retaining surface of each tooth except the last being right-angled, the last tooth being sloped, and a resilient detent cooperative with said ratchet teeth pivotally mounted as to be movable both vertically and axially with relation to its pivot pin.

10. In a compensating winding mechanism for roll film cameras and the like, the combination of a driving gear, a crank and associated clutch adapted to rotate the gear continuously when moved in one direction and disengage therefrom when moved in the opposite direction, a pivotally mounted segmental compensating member concentric with and movable independently of the gear wheel, said member carrying a stop adapted to engage latch mechanism associated with the crank for restricting the movement of the crank to predetermined fractions of a full revolution, and an arcuate cam rail adjacent the periphery of the segmental compensating member for controlling the crank latch in relation to its engagement with the segmental compensating member.

11. In a compensating winding mechanism, a gear wheel, a crank and one way clutch, means permitting a plurality of continuous revolutions of said gear, means for limiting the movements of the crank and gear to predetermined fractions of a full revolution, and means for varying the succeeding fractions of a full revolution relative to each other.

In testimony whereof I affix my signature.

EUGENE C. THOMPSON.